(12) United States Patent
Hung

(10) Patent No.: US 8,423,286 B2
(45) Date of Patent: Apr. 16, 2013

(54) METHOD FOR DISPLAYING ACTIVITY INFORMATION ON A NAVIGATION DEVICE AND RELATED NAVIGATION DEVICE

(75) Inventor: Shun-Cheng Hung, Taipei (TW)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 334 days.

(21) Appl. No.: 12/905,023

(22) Filed: Oct. 14, 2010

(65) Prior Publication Data
US 2011/0093196 A1    Apr. 21, 2011

(30) Foreign Application Priority Data
Oct. 16, 2009   (TW) ............................... 98135101 A

(51) Int. Cl.
G01C 21/00    (2006.01)
G01C 21/26    (2006.01)

(52) U.S. Cl.
USPC ........... 701/409; 701/468; 701/522; 701/516; 340/995.24

(58) Field of Classification Search .................... 701/426
See application file for complete search history.

(56) References Cited

U.S. PATENT DOCUMENTS

| | | | |
|---|---|---|---|
| 6,542,814 B2 * | 4/2003 | Polidi et al. | 701/454 |
| 6,553,310 B1 * | 4/2003 | Lopke | 701/454 |
| 6,829,532 B2 * | 12/2004 | Obradovich et al. | 701/425 |
| 6,952,644 B2 * | 10/2005 | Nakagawa | 701/438 |
| 7,471,215 B2 * | 12/2008 | Wada | 340/990 |
| 8,160,815 B2 * | 4/2012 | Geelen | 701/410 |
| 8,326,524 B2 * | 12/2012 | Harada | 701/409 |
| 2004/0012506 A1 * | 1/2004 | Fujiwara et al. | 340/995.1 |
| 2006/0217883 A1 * | 9/2006 | Nomura | 701/208 |
| 2008/0125966 A1 * | 5/2008 | Yamazaki | 701/208 |
| 2008/0300775 A1 * | 12/2008 | Habaguchi | 701/116 |

FOREIGN PATENT DOCUMENTS

| | | | |
|---|---|---|---|
| EP | 2141453 A1 | * | 1/2010 |
| JP | 2000-266550 | * | 9/2000 |
| JP | 2009-92443 | * | 4/2009 |
| TW | 200918859 | | 5/2009 |

* cited by examiner

Primary Examiner — Michael J Zanelli
(74) Attorney, Agent, or Firm — Winston Hsu; Scott Margo

(57) ABSTRACT

A navigation method includes receiving a positioning signal, displaying a navigation map corresponding to the positioning signal, receiving a plurality of activity information with latitude and longitude, providing an information preference menu, and displaying an activity icon of corresponding activity information on a corresponding activity location of the navigation map according to the setting of the information preference menu and the latitude and longitude.

23 Claims, 7 Drawing Sheets

METHOD FOR DISPLAYING ACTIVITY INFORMATION ON A NAVIGATION DEVICE AND RELATED NAVIGATION DEVICE

BACKGROUND OF THE INVENTION

1. Field of the Invention

The present invention relates to a navigation method and a related navigation device, and more specifically, to a navigation method for displaying activity information on a navigation device and a related navigation device.

2. Description of the Prior Art

With development of satellite positioning technology, a GPS (Global Positioning System) has commonly used in daily life, such as a navigation device.

A conventional navigation device usually includes a map data base for providing navigation paths displayed on a screen of the navigation device. The navigation device is usually embedded in or disposed on a dashboard of a car by absorbing components or other fixing components for use convenience. Besides the said navigation function, the navigation device has also developed many additional functions related to navigation information for meeting user needs. Thus, a user may acquire daily information easily via a system server which is wirelessly connected to the navigation device. For example, when a user wants to acquire information about the neighboring Japanese restaurants, the user just needs to operate the navigation device to connect to the system server in a wireless communication manner (e.g. 3G (Third Generation) or GPRS (General Packet Radio Service)), and then inputs a related keyword (e.g. Japanese restaurant) into the navigation device. Subsequently, the system server may transmit a corresponding location list back to the navigation device according to the user's current location obtained from a positioning satellite and a compared result of the input keyword and its data base, wherein the location list is displayed in text as shown in FIG. 1. Thus, the user may browser the related description for the neighboring Japanese restaurants via the location list. If the user wants to go to one of these Japanese restaurants listed on the location list, the user may just follow the path guidance of the navigation device to arrive at the corresponding location.

As mentioned above, the method for wirelessly acquiring daily information is commonly applied to a navigation device, so that the navigation device can provide a user with various navigation related services. However, since the user needs to select the activity information displayed in text one by one in this method so as to make the user incapable of knowing the related activity locations directly and clearly, this method is still not convenient enough in search of information and operation of device. In addition, over-long querying time and less intuitive operations may also endanger the user easily while driving a car.

Thus, how to let a user view activity information clearly at a glance should be a concern in information providing of a navigation device.

SUMMARY OF THE INVENTION

The present invention provides a method for displaying activity information on a navigation device, the method comprising receiving a positioning signal; displaying a navigation map corresponding to the positioning signal; receiving a plurality of activity information with latitude and longitude; providing an information preference menu; and displaying an activity icon of corresponding activity information on a corresponding activity location of the navigation map according to the setting of the information preference menu and the latitude and longitude.

The present invention further provides a navigation device capable of displaying activity information, the navigation device comprising a GPS receiving unit for receiving a positioning signal; a data storage unit for storing a navigation map; a display unit for displaying the navigation map corresponding to the positioning signal; an information transceiver for receiving a plurality of activity information with latitude and longitude; a processing unit for providing an information preference menu and for controlling the display unit to display an activity icon of corresponding activity information on a corresponding activity location of the navigation map according to the setting of the information preference menu and the latitude and longitude.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
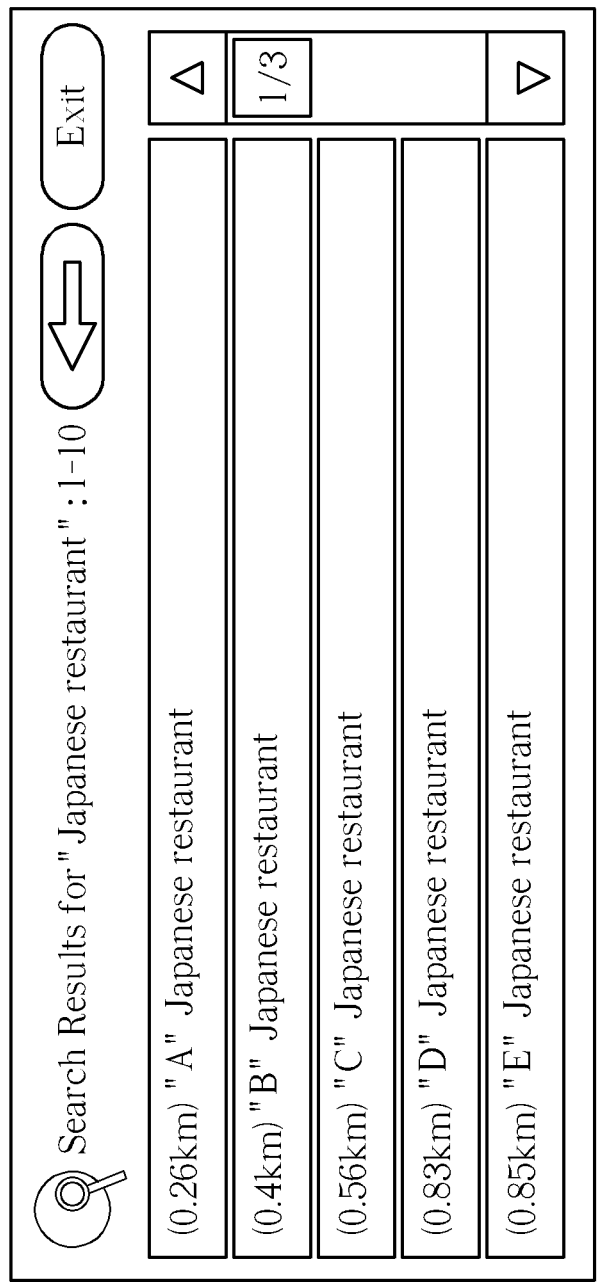
FIG. 1 is a diagram of displaying information searching results in text in the prior art.
Figure 2:
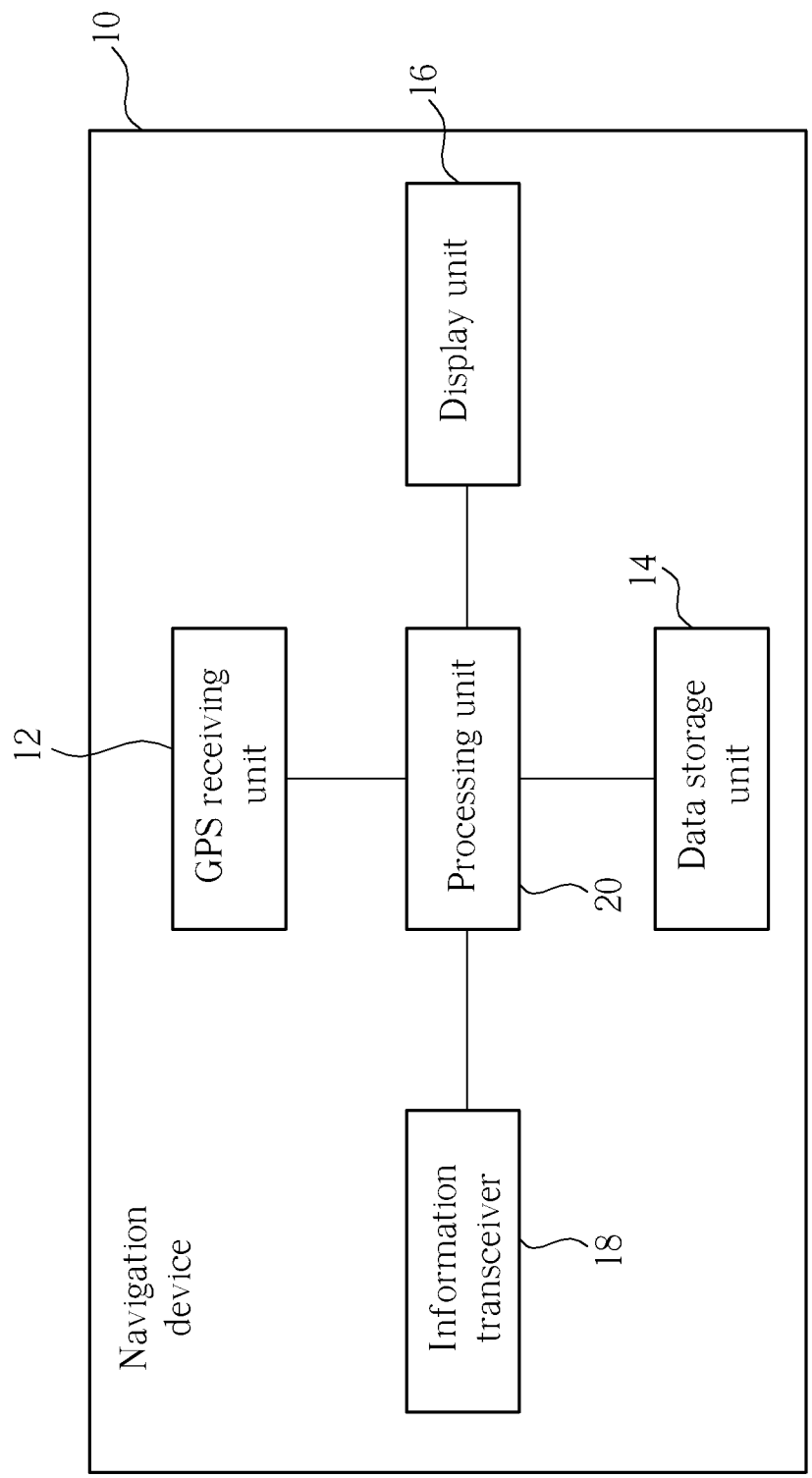
FIG. 2 is a functional block diagram of a navigation device according to a preferred embodiment of the present invention.

Please refer to FIG. 2, which is a functional block diagram of a navigation device 10 according to a preferred embodiment of the present invention. As shown in FIG. 2, the navigation device 10 includes a GPS receiving unit 12, a data storage unit 14, a display unit 16, an information transceiver 18, and a processing unit 20. The GPS receiving unit 12 is used for receiving a positioning signal. The data storage unit 14 is used to store data needed for performing navigation functions provided by the navigation device 10. For example, when the GPS receiving unit 12 receives a positioning signal, the processing unit 20 may control the display unit 16 to display a corresponding navigation map provided by the data storage unit 14 according to the positioning signal; or, when a user wants to look up navigation information, the processing unit 20 may control the display unit 16 to display a user interface provided by the data storage unit 14 for allowing the user to input query information. As mentioned above, the display unit 16 can be used for displaying a corresponding navigation map provided by the data storage unit 14 according to the positioning signal. The information transceiver 18 is used for receiving a plurality of activity information. Each activity information includes an activity location with latitude and longitude. The processing unit 20 is used for controlling the display unit 16 to display an activity icon of corresponding activity information on a corresponding activity location of the navigation map according to the latitude and longitude, and is used for controlling the display unit 16 to display a navigation related message when the activity icon is selected.

Figure 3:
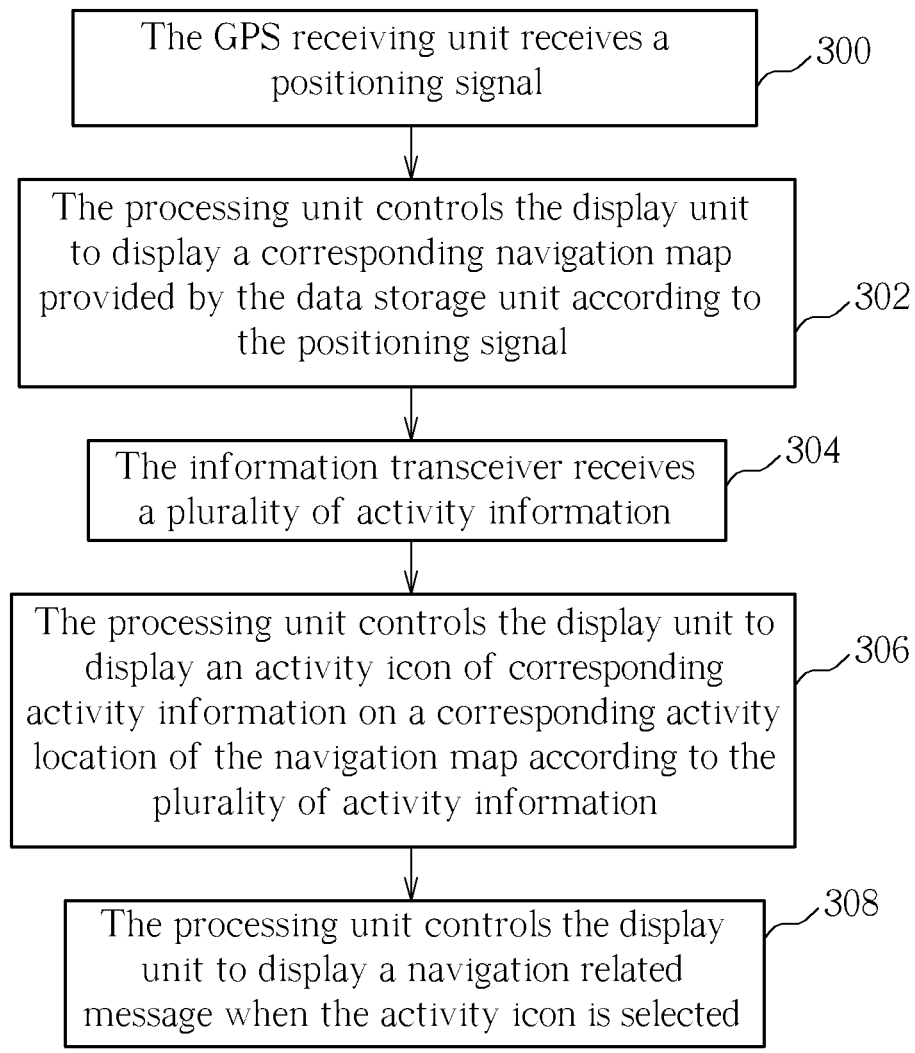
FIG. 3 is a flowchart of a method for displaying activity information on the navigation device in FIG. 2.

Please refer to FIG. 3, which is a flowchart of a method for displaying activity information on the navigation device 10 in FIG. 2. The method includes the following steps.

Step 300: The GPS receiving unit 12 receives a positioning signal.

Step 302: The processing unit 20 controls the display unit 16 to display a corresponding navigation map 22 provided by the data storage unit 14 according to the positioning signal;

Step 304: The information transceiver 18 receives a plurality of activity information.

Step 306: The processing unit 20 controls the display unit 16 to display an activity icon 24 of corresponding activity information on a corresponding activity location of the navigation map 22 according to the plurality of activity information.

Step 308: The processing unit 20 controls the display unit 16 to display a navigation message when the activity icon 24 is selected.

Figure 4:
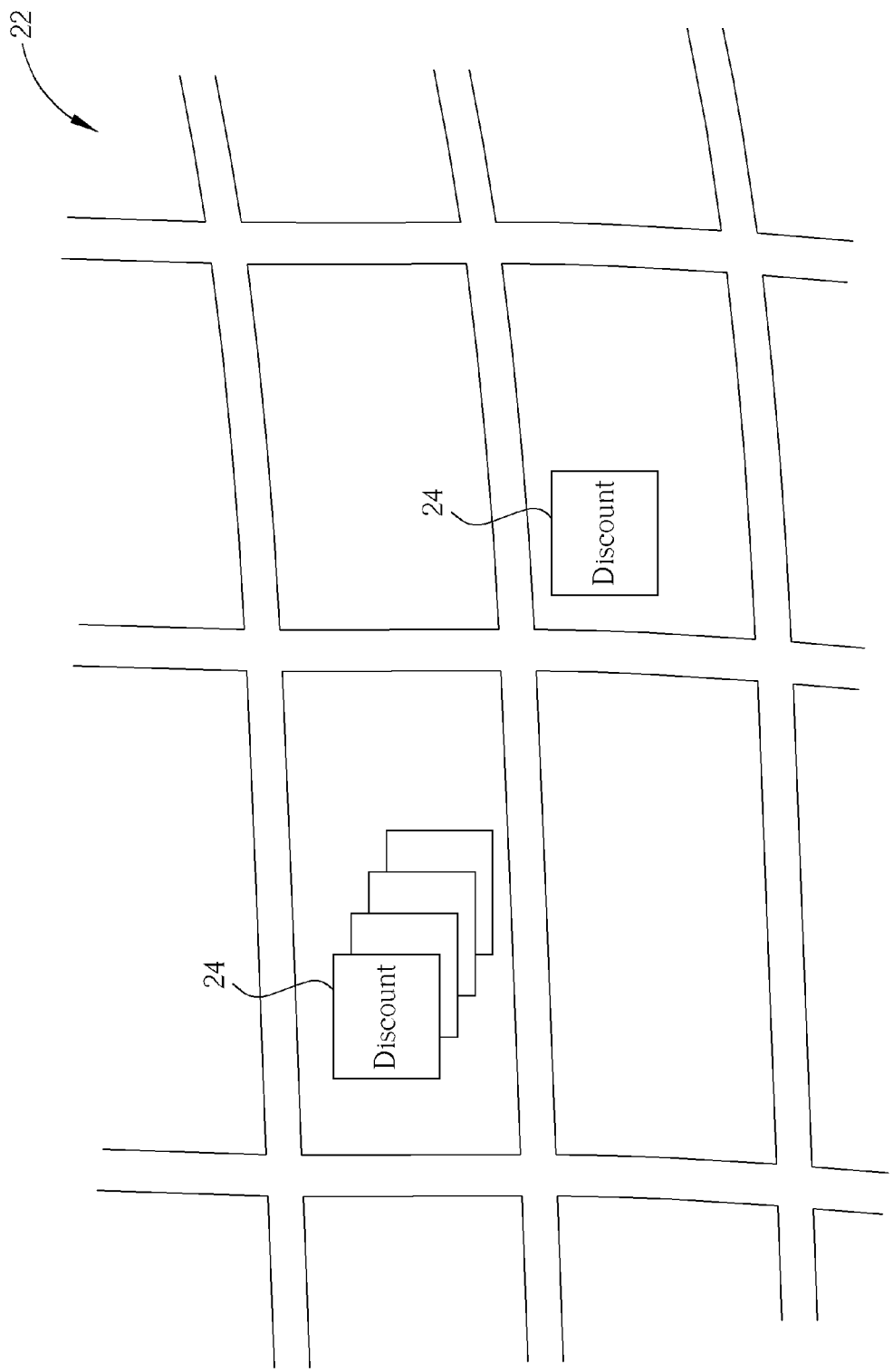
FIG. 4 is a diagram of a display unit in FIG. 2 displaying a navigation map.

More detailed description for the said steps is provided as follows. First, in Step 300, when a user turns on the navigation device 10, the navigation device 10 may utilize the GPS receiving unit 12 to receive the positioning signal corresponding to its current location from a navigation satellite. At this time, since the processing unit 20 is capable of positioning the user's current location according to the positioning signal, the processing unit 20 may acquire the navigation map 22 corresponding to the positioning signal from the data storage unit 14 accordingly and then control the display unit 16 to display the navigation map 22 (Step 302) for providing the user with a path guiding function or other related navigation services. As for display of navigation map 22, it may as shown in FIG. 4 (but is not limited thereto), which is a diagram of the display unit 16 in FIG. 2 displaying the navigation map 22.

After performing the said steps, the navigation device 10 may receive the plurality of activity information via the information transceiver 18. In the present invention, the information transceiver 18 may receive the plurality of activity information by a passively searching method or an actively receiving method. In this embodiment, the information transceiver 18 may preferably utilize the said passively searching method to receive the plurality of activity information.

In the following, the said two methods are respectively described in detail. First, as far as the passively searching method is concerned, a user may utilize a user interface provided by the data storage unit 14 to input query information when the user wants to look up activity information near the user's location. After the information transceiver 18 transmits the positioning signal and the query information to a system server in a wireless communication manner (e.g. GPRS), the system server may compare the positioning signal and the query information with its data base to generate the plurality of activity information corresponding to the positioning signal and the query information. Subsequently, the system server may transmit the plurality of activity information back to the information transceiver 18. Since the plurality of activity information is generated based on the said compared result of the positioning signal and the query information with the data base of the system server, the latitude and longitude corresponding to each activity information transmitted from the system server must be located on the navigation map 22. Thus, the processing unit 20 may directly control the display unit 16 to display the corresponding activity icon 24 on the navigation map 22 (Step 306) as shown in FIG. 4 without performing any additional information-filtering step.

On the other hand, in the actively receiving method, the information transceiver 18 may be actively connect to a system server via TMC (Traffic Message Channel) broadcasting communication or 3G wireless communication during operation of the navigation device 10, so that the information transceiver 18 may receive the plurality of activity information from the system server. Unlike the system server utilized in the said actively searching method, the system server utilized in this actively receiving method does not provide an information compared service. Thus, after receiving the plurality of activity information, the information transceiver 18 may need to determine whether the latitude and longitude of each activity information are located on the navigation map 22 and then remove the activity information, the latitude and longitude of which are not located on the navigation map 22. Subsequently, when the processing unit 20 determines the plurality of activity information includes at least one activity information, the latitude and longitude of which are located on the navigation map 22, the processing unit 20 may control the display unit 16 to display the activity icon 24 of the corresponding activity information on a corresponding activity location of the navigation map 22 as shown in FIG. 4.

Furthermore, for achieving the purpose of further filtering unnecessary activity information, the present invention may additionally set specific filtering conditions in receiving of activity information, such as providing an information preference menu or deleting activity information beyond a specific distance range. For example, the processing unit 20 may control the display unit 16 to display an information preference menu which includes a plurality of activity-type options, and then a user may select the desired activity-type options via the information preference menu. In such a manner, the processing unit 20 may further filter the activity information that the user has no interest to know according to the setting of the information preference menu. It should be noted that the information preference menu may be provided from the said system server according to a compared result of the positioning signal and its data base or directly provided by the data storage unit 14. The method for providing information preference menu is commonly seen in the prior art, and the related description is omitted herein.

In addition, the method for receiving activity information is mot limited to the methods mentioned in the said embodiment. For example, the information transceiver 18 may also receive activity information by a manually inputting method so that the received activity amount of the information transceiver 18 may be further increased. That is, a user can input activity information, which is known to him, into the information transceiver 18 manually, such as inputting activity bar codes into the navigation device 10 so that the navigation device 10 may acquire the corresponding activity information by a decoding software installed therein.

Furthermore, as shown in FIG. 4, if there is a plurality of activities held at the same location (e.g. a department store), meaning that the display unit 16 may simultaneously display a plurality of activity icons 24 at this location, the processing unit 20 may control the display unit 16 to display the plurality of activity icons 24 in a stacked manner (four stacked as shown in FIG. 4) for viewing convenience of the user. As for the stacked sequence of the activity icons 24, it may be determined based on the start/close time of each activity or the duration of each activity.

Figure 5:
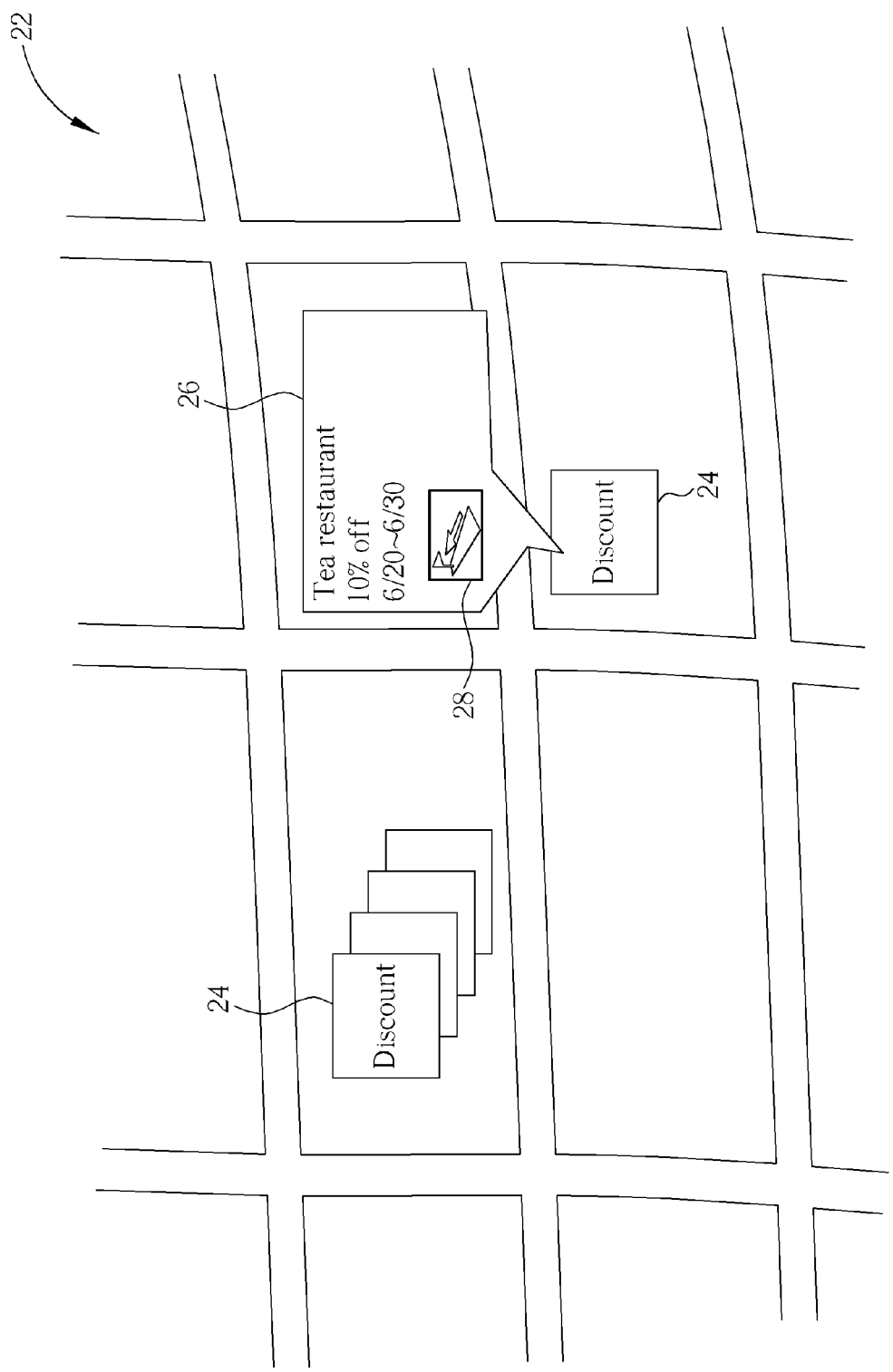
FIG. 5 is a diagram of displaying an enlarged window on the navigation map in FIG. 4.

After the display unit 16 displays at least one activity icon 24 of corresponding activity information on the navigation map 22, the navigation device 10 may further provide the navigation related message when the user selects one of the activity icons 24 (Step 308). For example, if the user selects one activity icon 24 displayed on the navigation map 22, the processing unit 20 may control the display unit 16 to display an enlarged window 26 on the navigation map 26 when the activity icon 24 is selected. Display of the enlarged window 26 may be as shown in FIG. 5 (but is not limited thereto), which is a diagram of displaying the enlarged window 26 on the navigation map 22 in FIG. 4. As shown in FIG. 5, the enlarged window 26 includes text description for an activity organizer (e.g. Tea restaurant), an activity introduction (e.g. 10% off), and an activity duration (e.g. 6/20~6/30) of the activity information. In such a manner, the user may view detailed description for the activity information clearly at a glance.

Besides, as shown in FIG. 5, the processing unit 20 may also control the display unit 16 to display a navigation icon 28 on the enlarged window 26, but is not limited thereto, meaning that the processing unit 20 may also control the display unit 16 to directly display the navigation icon 28 on the activity icon 24 instead. Thus, when the user wants to go to the activity location corresponding to the said activity icon 24, the user just needs to select the navigation icon 28 displayed on the enlarged window 26 of the activity icon 24. After the navigation icon 28 is selected, the processing unit 20 may automatically perform a navigation function for planning a route to the corresponding activity location (e.g. controlling the display unit 16 to display a corresponding navigation path on the navigation map 22), so as to provide the user with a real-time navigation service.

Furthermore, in the present invention, the processing unit 20 is further used for providing a reminder message when determining a current location of the navigation device 10 is closer within a predetermined distance from one of the activity icons 24 on the navigation map 22, and is further used for adjusting display of the activity icon 24 on the display unit 16 according to a compared result of a current time and an activity duration of the activity information. In other words, after the processing unit 20 controls the display unit 16 to display the activity icons 24 on the navigation map 22, control of the processing unit 20 for the display unit 16 may vary with the relation between the activity information received by the information transceiver 18 and the navigation device 10. Related description is sequentially provided as follows.

Figure 6:
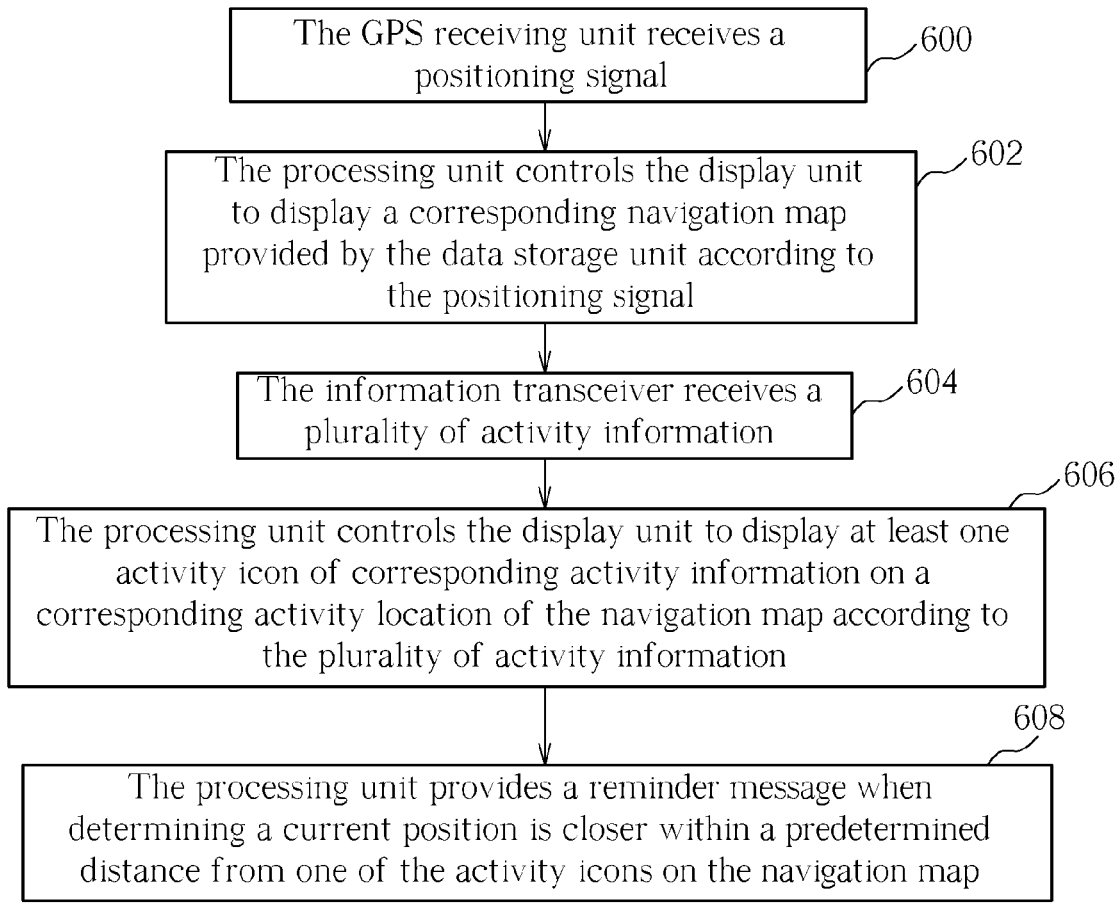
FIG. 6 is a flowchart of a method for displaying activity information on the navigation device in FIG. 2 according to another preferred embodiment of the present invention.

Please refer to FIG. 6, which is a flowchart of a method for displaying activity information on the navigation device 10 in FIG. 2 according to another preferred embodiment of the present invention. The method includes the following steps.

Step 600: The GPS receiving unit 12 receives a positioning signal.

Step 602: The processing unit 20 controls the display unit 16 to display a corresponding navigation map 22 provided by the data storage unit 14 according to the positioning signal;

Step 604: The information transceiver 18 receives a plurality of activity information.

Step 606: The processing unit 20 controls the display unit 16 to display an activity icon 24 of corresponding activity information on a corresponding activity location of the navigation map 22 according to the plurality of activity information.

Step 608: The processing unit 20 controls the display unit 16 to provide a reminder message when determining a current location of the navigation device 10 is closer within a predetermined distance from the activity location corresponding to one of the activity icons 24 on the navigation map 22.

As shown in FIG. 3 and FIG. 6, a major difference between this embodiment and the said embodiment is the last step. Thus, Only Step 608 is described in detail as follows. As for the other steps, since they are the same as those mentioned in FIG. 3, the related description is therefore omitted herein. After the navigation device 10 performs Steps 600-606, the navigation device 10 may make a user view all activity information on the navigation map 22 clearly at a glance by a method for directly displaying the activity icon 24 of corresponding activity information on the corresponding activity location of the navigation map 22.

Next, FIG. 5 is taken as an example for description of Step 608. As shown in FIG. 5, the navigation device 10 may further provide an active reminder service by performing Step 608. That is, as mentioned in Step 608, the processing unit 20 may provide a reminder message when determining the current location is closer within the predetermined distance from one of activity icons 24 on the navigation map 22. For example, if the predetermined distance is 500 m and the navigation device 10 approaches the activity location corresponding to one of the activity icons 24 on the navigation map 22, the processing unit 20 may control the display unit 16 to display the corresponding enlarged window 26 on the activity icon 24 when determining the navigation device 10 moves to a location which is at 500 m from the activity location. As shown in FIG. 5, the enlarged window 26 includes the text description for an activity organizer, an activity introduction, and an activity duration of the activity information, so as to let the user know detailed description for the neighboring activities.

Furthermore, the method for providing a reminder message by the processing unit 20 is not limited to the said example. That is, the processing unit 20 may also utilize other conventional reminder method, such as controlling the navigation device 10 to output an audio signal or to generate vibration.

Figure 7:
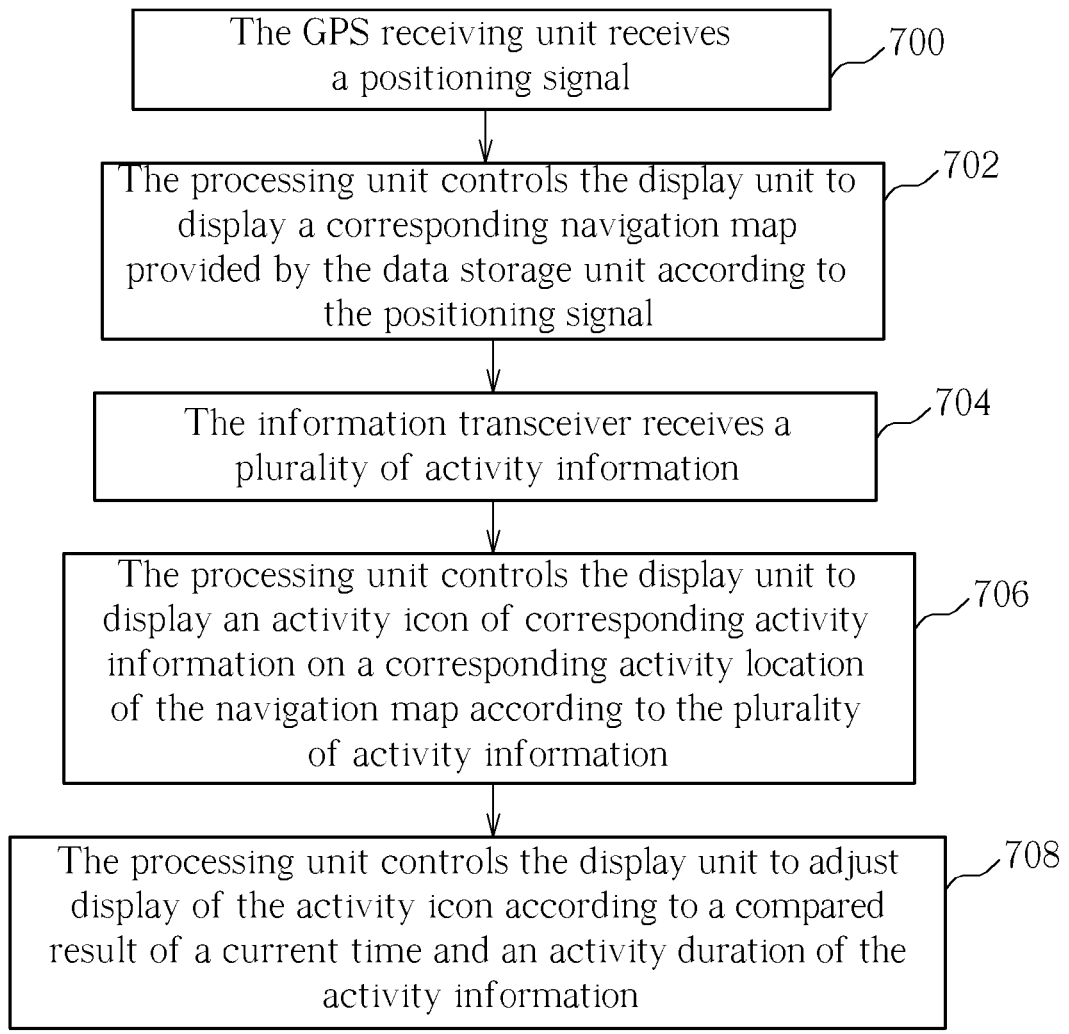
FIG. 7 is a flowchart of a method for displaying activity information on the navigation device in FIG. 2 according to another preferred embodiment of the present invention.

Please refer to FIG. 7, which is a flowchart of a method for displaying activity information on the navigation device 10 in FIG. 2 according to another preferred embodiment of the present invention. The method includes the following steps.

Step 700: The GPS receiving unit 12 receives a positioning signal.

Step 702: The processing unit 20 controls the display unit 16 to display a corresponding navigation map 22 provided by the data storage unit 14 according to the positioning signal;

Step 704: The information transceiver 18 receives a plurality of activity information.

Step 706: The processing unit 20 controls the display unit 16 to display an activity icon 24 of corresponding activity information on a corresponding activity location of the navigation map 22 according to the plurality of activity information.

Step 708: The processing unit 20 controls the display unit 16 to adjust display of the activity icon 24 on the display unit 16 according to a compared result of a current time and an activity duration of the activity information.

As shown in FIG. 3, FIG. 6, and FIG. 7, a major difference between this embodiment and the said embodiments is the last step. Thus, Only Step 708 is described in detail as follows. As for the other steps, since they are the same as those mentioned in FIG. 3, the related description is therefore omitted herein. After the navigation 10 performs Steps 700-706, the navigation device 10 may make a user view all activity information on the navigation map 22 clearly at a glance by a method for directly displaying the activity icon 24 of corresponding activity information on the corresponding activity location of the navigation map 22.

Next, the navigation device 10 can let the user know differences between the activity icons 24 on the navigation map 22 more clearly by performing Step 708. That is, as mentioned in Step 708, the processing unit 20 may adjust display of the activity icon 24 on the display unit 16 according to a compared result of a current time and an activity duration of the activity information. For example, it is assumed that the navigation device 10 marks an activity which is proceeding, an activity which is coming to a close, and an activity which is not started respectively in a blue color, a red color, and a gray color. In other words, when the processing unit 20 determines that the current time lies in an activity duration of an activity information, the processing unit 20 may control the display unit 16 to display the corresponding activity icon 24 in a blue color so as to inform the user that the activity corresponding to this blue activity icon 24 is proceeding. When the processing unit 20 determines that the current time lies in an activity duration of an activity information and a difference of the current time and a close time of the activity duration is less than a specific value (e.g. 3 days), the processing unit 20 may control the display unit 16 to display the corresponding activity icon 24 in a red color so as to inform the user that the activity corresponding this red activity icon 24 is coming to a close.

Furthermore, if the processing unit 20 determines that the current time is earlier than a start time of an activity duration of an activity information, the processing unit 20 may control the display unit 16 to display the corresponding activity icon 24 in a gray color so as to inform the user that the activity corresponding to this gray activity icon 24 is not yet started. Instead, if the processing unit 20 determines that the current time is later than a close time of an activity duration of an activity information, the processing unit 20 may control the display unit 16 to stop displaying the corresponding activity icon 24 so as to filter useless activity information for the user.

It should be mentioned that the aforementioned steps (i.e. Step 308, Step 608, and Step 708) performed after the processing unit 20 controls the display unit 16 to display the activity icons 24 may be mutually applied to each other.

Compared with the prior art, in which activity information is displayed in text, the navigation device provided by the present invention may make a user view all activity information on a navigation map clearly at a glance by a method for directly displaying activity icons of corresponding activity information on corresponding activity locations of the navigation map.

Furthermore, as mentioned in the said embodiments, the navigation device provided by the present invention may provide more useful and detailed activity information to a user by performing the said steps (i.e. providing an information preference menu and reminder messages and marking activity icons in a specific color).

In such a manner, this intuitive icon displaying method may let a user know detailed description for activity information more easily and clearly. Thus, not only use convenience of the navigation device in search of information and operation of device may be increased, but time needed for querying activity information may also be reduced accordingly so as to further ensure driving safety of a user.

Those skilled in the art will readily observe that numerous modifications and alterations of the device and method may be made while retaining the teachings of the invention.

What is claimed is:

1. A method for displaying activity information on a navigation device, the method comprising:
   receiving a positioning signal;
   displaying a navigation map corresponding to the positioning signal;
   receiving a plurality of activity information with latitude and longitude;
   providing an information preference menu;
   displaying an activity icon of corresponding activity information on a corresponding activity location of the navigation map according to the setting of the information preference menu and the latitude and longitude; and
   providing a reminder message when a current location of the navigation device is closer within a predetermined distance from the activity icon on the navigation map.

2. The method of claim 1, wherein receiving the plurality of activity information comprises:
   inputting query information;
   connecting to a system server wirelessly;
   transmitting the positioning signal and the query information to the system server; and
   receiving the plurality of activity information corresponding to the positioning signal and the query information from the system server.

3. The method of claim 1, wherein receiving the plurality of activity information comprises:
   connecting to a system server through TMC (Traffic Message Channel) broadcasting communication or 3G (Third Generation) wireless communication; and
   receiving the plurality of activity information from the system server.

4. The method of claim 3, wherein displaying the activity icon of the corresponding activity information on the corresponding activity location of the navigation map according to the setting of the information preference menu and the latitude and longitude comprises:
   displaying the activity icon of the corresponding activity information on the corresponding activity location of the navigation map when determining the latitude and longitude of the activity location are located on the navigation map.

5. The method of claim 1, wherein receiving the plurality of activity information comprises:
   receiving the plurality of activity information in a manually-inputting manner.

6. The method of claim 1, wherein displaying the activity icon of the corresponding activity information on the corresponding activity location of the navigation map according to the setting of the information preference menu and the latitude and longitude comprises:
   displaying a plurality of activity icons at the activity location in a stacked manner, the plurality of activity icons respectively corresponding to activity information located at the activity location.

7. The method of claim 1 further comprising:
   displaying a navigation related message when the activity icon is selected.

8. The method of claim 7, wherein displaying the navigation related message when the activity icon is selected comprises:
   displaying an enlarged window on the navigation map when the activity icon is selected, the enlarged window comprising text description for an activity organizer, an activity introduction, and an activity duration of the activity information.

9. The method of claim 7, wherein displaying the navigation related message when the activity icon is selected comprises:
   displaying a navigation icon on the activity icon; and
   automatically performing a navigation function for planning a route to the corresponding activity location after the navigation icon is selected.

10. The method of claim 1 further comprising:
adjusting display of the activity icon according to a compared result of a current time and an activity duration of the activity information.

11. The method of claim 10, wherein adjusting display of the activity icon according to the compared result of the current time and the activity duration of the activity information comprises:
displaying the activity icon in a specific color when determining the current time lies in the activity duration of the activity information or is earlier than a start time of the activity duration.

12. The method of claim 10, wherein adjusting display of the activity icon according to the compared result of the current time and the activity duration of the activity information comprises:
stopping displaying the activity icon when determining the current time is later than the activity duration of the activity information.

13. A navigation device capable of displaying activity information, the navigation device comprising:
a GPS (Global Positioning System) receiving unit for receiving a positioning signal;
a data storage unit for storing a navigation map;
a display unit for displaying the navigation map corresponding to the positioning signal;
an information transceiver for receiving a plurality of activity information with latitude and longitude;
a processing unit for providing an information preference menu and for controlling the display unit to display an activity icon of corresponding activity information on a corresponding activity location of the navigation map according to the setting of the information preference menu and the latitude and longitude, and the processing unit being further for providing a reminder message when determining a current location of the navigation device is closer within a predetermined distance from the activity icon on the navigation map.

14. The navigation device of claim 13, wherein the data storage unit is used for providing a user interface, the information transceiver is further used for transmitting the positioning signal and query information to a system server wirelessly and receiving the plurality of activity information from the system server when inputting the query information via the user interface, and the plurality of activity information corresponds to the positioning signal and the query information.

15. The navigation device of claim 13, wherein the processing unit is further used for controlling the display unit to display the activity icon of the corresponding activity information on the corresponding activity location of the navigation map when determining the latitude and longitude of the activity information are located on the navigation map.

16. The navigation device of claim 13, wherein the information transceiver receives the plurality of activity information in a manually-inputting manner.

17. The navigation device of claim 13, wherein the processing unit is further used for controlling the display unit to display the plurality of activity icons at the activity location in a stacked manner, and the plurality of activity icons respectively corresponds to activity information located at the activity location.

18. The navigation device of claim 13, wherein the processing unit is further used for controlling the display unit to display a navigation related message corresponding to the activity icon.

19. The navigation device of claim 18, wherein the processing unit is further used for controlling the display unit to display an enlarged window corresponding to the activity icon on the navigation map, and the enlarged window includes text description for an activity organizer, an activity introduction, and an activity duration of the activity information.

20. The navigation device of claim 18, wherein the processing unit is further used for controlling the display unit to display a navigation icon on the activity icon and for performing a navigation function for planning a route to the corresponding activity location corresponding to the activity icon.

21. The navigation device of claim 13, wherein the processing unit is further used for controlling the display unit to adjust display of the activity icon according to a compared result of a current time and an activity duration of the activity information.

22. The navigation device of claim 21, wherein the processing unit is further used for controlling the display unit to display the activity icon in a specific color when determining the current time lies in the activity duration of the activity information or is earlier than a start time of the activity duration.

23. The navigation device of claim 21, wherein the processing unit is further used for controlling the display unit to stop displaying the activity icon when the current time is later than a close time of the activity duration.

* * * * *